Dec. 5, 1961 P. J. KIRCHER 3,011,428
COFFEE MAKER
Filed March 25, 1958
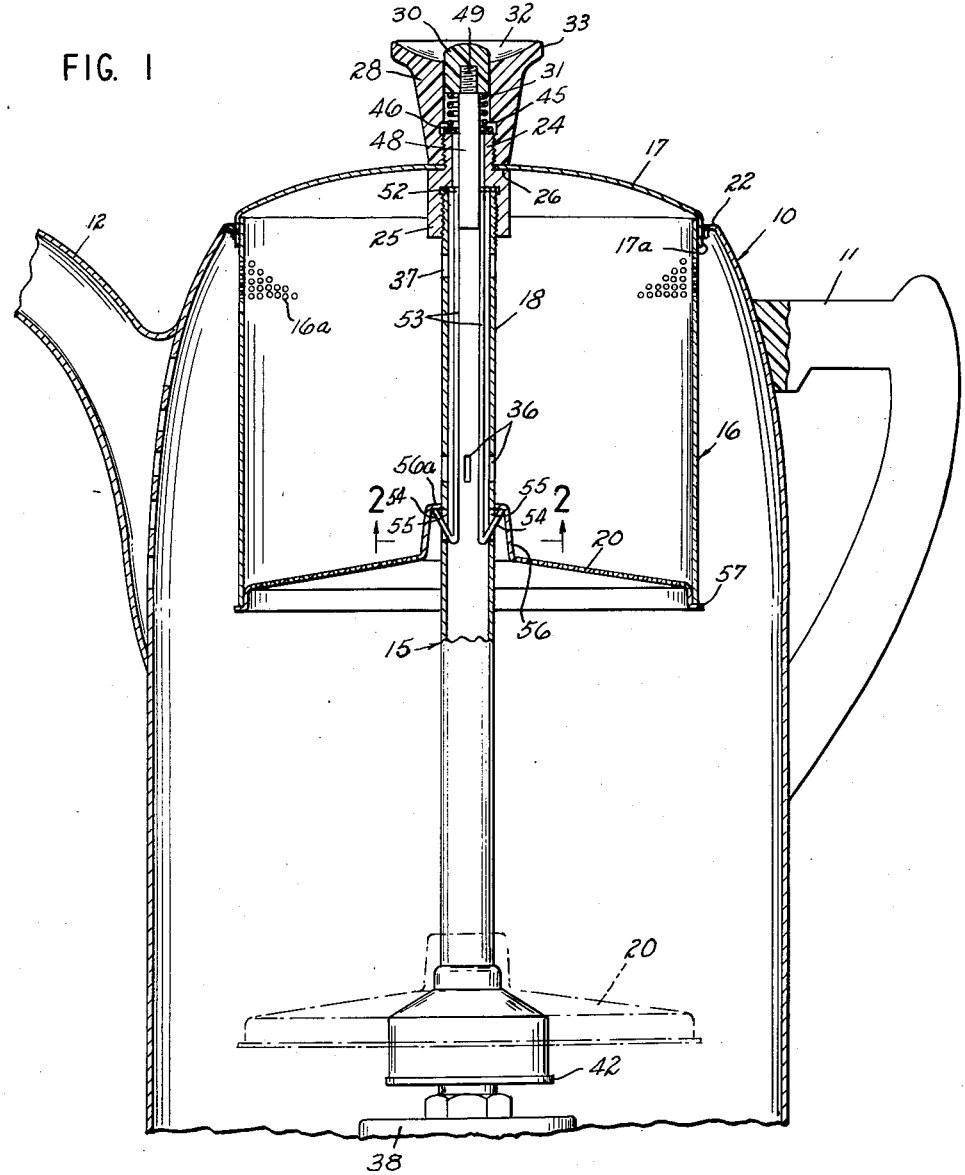
INVENTOR
PAUL J. KIRCHER
BY *Lindsey and Prutzman*
ATTORNEYS

3,011,428
COFFEE MAKER
Paul J. Kircher, Plainville, Conn., assignor to Landers, Frary & Clark, New Britain, Conn., a corporation of Connecticut
Filed Mar. 25, 1958, Ser. No. 723,824
5 Claims. (Cl. 99—310)

This invention relates generally to coffee makers and more particularly to novel improvements in coffee makers of the percolator type.

An object of the invention is to improve and simplify the construction of coffee makers of the percolator type so as to reduce the number of separate parts required and to improve the construction and operation thereof.

Another object is to improve and simplify the construction of coffee percolators to improve the appearance thereof, facilitate loading and removal of coffee from the basket, and to permit easy cleaning of all parts removable from the liquid vessel while those parts are connected in unitary assembly.

A further object is to improve the fountain action of percolators by introducing the fountain liquid to the coffee in a novel manner.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a fragmentary view largely in longitudinal section of a coffee percolator incorporating the present invention.

FIG. 2 is a section taken along 2—2 of FIG. 1.

FIG. 1 illustrates a percolator including a main body or vessel 10 in which water is heated and converted to coffee by percolation, vessel 10 being provided with the conventional handle 11 and spout 12. FIG. 1 is broken above the bottom wall, hence does not show the heating means which forms no part of this invention, it being understood that liquid contained in vessel 10 may be heated either from an external source or by electrical heating elements incorporated in the base thereof. Portions of the percolator removable from vessel 10 are cooperatively connected to provide a unitary assembly generically designated 15, comprising a metal cylinder 16, the upper end of which is closed by an imperforate cap 17 having depending margins 17a secured to cylinder 16.

The inverted basket thus formed by cylinder 16 and cap 17 is mounted open end down on a fountain tube 18 with cap serving as the vessel cover and the lower open end of cylinder 16 closed during use by an apertured annular drip tray 20, slidably mounted on fountain tube 18, the lower end of which terminates in a pump 42 receivable in a well structure 38 to be supported thereby. Tray 20 may be released from its position closing the lower end of cylinder 16 by manual depression of push button 30, mounted vertically of wall 17, to permit tray 20 to drop from the heavy-line to the lower dotted-line position for removal of spent coffee grounds or for loading, with basket 16 held open end up.

As shown in FIG. 1, the top of vessel 10 is provided with a circular opening defined by inwardly rolled margin 22 of the vessel side wall. Cap 17 of basket 16, which serves as the percolator cover includes marginal portions 17a of a diameter snugly to engage marginally rolled portion 22 of vessel 10. Cap 17 is provided with a central aperture through which a threaded boss 24 of coupling 25 projects upwardly, portions of cap 17 marginally of said aperture being clamped between annular shoulder 26 of coupling 25 and the lower end of a heat insulating knob 28, axially bored for threaded engagement with a boss 24 and for reception of a push button 30 biased upwardly as shown by helical spring 31, knob 28 being dished at 32 and marginally contoured at 33 to provide easy thumb depression of button 30 for release of tray 20 as described below. The lower end of coupling 25 is threadedly connected to the upper end of fountain tube 18, tube 18 terminating at its lower end in a conventional pump structure 42 and associated well structure 38 serving also as the support for tube 18.

As heated fluid rises under pressure in fountain tube 18, the upper end of which is closed by tray release mechanism later described, a portion thereof is ejected radially through apertures 36 positioned below the level of the normal charge of coffee held in the basket. With increased pumping, the liquid so introduced directly to the ground coffee produces a floating effect to hold the particles thereof in suspension. Shortly thereafter the rising pressure tube liquid is also ejected from apertures 37, spaced substantially above apertures 36 and above the normal charge of coffee held therein, to be distributed as a fountain over the coffee. To limit the extent to which liquid may rise in the basket, and attendant pressure build-up, a plurality of apertures 16a are provided circumferentially of basket 16 for liquid escape at that level. The two sets of vertically spaced apertures substantially improve the percolator action through a more uniform presentation of coffee particles to the hot fountain tube liquid.

The axial bore provided in knob 28 for reception of button 30 and spring 31 is radially expanded at 45 for reception of washer 46 which rests on the upper end of boss 24 and is centrally provided with a square aperture to permit a rod 48, square in cross section, to be slidably received therein. The upper end of rod 48 is threaded to button 30 at 49 and extends downwardly to pass through a square central aperture of a second washer 52, clamped between a shouldered portion of coupling 25 and the upper threaded end of tube 18 to slidably position rod 48 while preventing rotation thereof.

A pair of elongate release springs 53 have their upper ends soldered, at 53a, FIG. 2, to opposite sides of rod 48, the lower ends thereof being reversely bent to provide upwardly and laterally extending hook-like fingers 54 which project through diametric apertures 55 of pressure tube 18. With button 30 biased by spring 31 to the extended position shown, fingers 54 are positioned to extend radially of tube 18 to engage an annular shoulder 56a of an upwardly extending cup portion 56 formed integrally with and centrally of tray 20, to latch the tray in the closed position with marginally flanged portion 57 thereof in clamped abutment with the lower end of cylinder 16.

Upon depression of button 30 against the bias of spring 31, fingers 54 are cammed inwardly against the lower margins of apertures 55 to be drawn within the wall area of fountain tube 18 to release tray 20 which drops to the dotted-line position shown. Upon release of push button 30, fingers 54 resume the extended position shown. Repositioning of the tray to the basket closing position cams fingers 54 inwardly of shoulder 56a and the ends of fingers 54 into apertures 55 of tube 18. Fingers 54 spring back into the extended position shown as cup 56 of tray 20 moves into position with tray 20 locked to fountain tube 18 and the marginal tray flanges snugly engaging the lower end of cylinder 16.

With tray 20 released and held spaced from cylinder 16, the basket is easily loaded, tray 20 latched, and fountain tube and basket assembly positioned as shown in FIG. 1. Easy removal is afforded by heat insulating knob 28, and with button 30 depressed to release tray 20 which falls to the lower dotted line position, the assembly may conveniently be placed under a water tap for removal of spent coffee grounds. Upon recharge of the basket for subsequent use, tray 20 is moved to the heavy line position, FIG. 1, where it automatically latches into place. The assembly is then positioned in the vessel with cover 17 serving as a cover snugly received in the opening marginally defined by rolled margin 22, the extent to which cap 17 projects therein being fixed by abutment of pump structure 42 with well structure 38, the cover being contoured to lend an attractive overall appearance when so positioned.

Other modifications and adaptations will be readily apparent to persons skilled in the art without departure from the inventive concepts taught herein, the scope of which are defined in the appended claims.

I claim:

1. In a coffee maker, a vessel having an open upper end and a percolator assembly contained within said vessel, said percolator assembly comprising a fountain tube having pump means at the lower end thereof, an imperforate cover, means fastening said cover to the upper end of said tube, said cover being dimensioned to close the upper end of said vessel, a perforated cylinder secured to said cover and extending downwardly therefrom around said tube, a perforated tray dimensioned to close the bottom of said cylinder and having an aperture therein receiving said tube, the aperture in said tray being dimensioned to permit movement of said tray along said tube toward and away from the bottom of said cylinder, and means securing said tray in engagement with the lower end of said cylinder, said means being independent of the vessel and releasable to permit movement of said tray away from said cylinder.

2. The device of claim 1 wherein said perforated tray is releasably secured to the bottom of said cylinder by a latch operative between said fountain tube and said tray.

3. The device of claim 1 wherein the means securing said tray in engagement with said cylinder includes a latch having associated therewith manually operable means mounted to said imperforate cover to release said tray for movement away from said cylinder.

4. The device of claim 1 wherein said means for securing said tray in engagement with said cylinder comprises a knob mounted on said imperforate cover and having a passageway therein communicating with said tube, an aperture in said tube in registry with said tray when said tray is in engagement with said cylinder, latch means extending into said tube and through said aperture, and a button disposed in the aperture of said knob and engaging said latch means to effect operation thereof.

5. The device of claim 1 wherein said means for releasably securing said tray in engagement with said cylinder comprises a knob having a central aperture communicating with said tube, a pair of laterally extending apertures in said tube positioned in registry with said tray when said tray is in engagement with said cylinder, a pair of elongate rods having upwardly bent hook-shaped ends extending through said lateral apertures in said tube to engage said tray, and a button disposed in the aperture of said knob and connected to said rods whereby depression of said knob causes said hook-shaped ends of said rods to engage the side walls of said laterally extending apertures to cam said ends into said fountain tube to release said tray for movement away from said cylinder.

References Cited in the file of this patent

UNITED STATES PATENTS

| | | |
|---|---|---|
| 60,204 | Lee | Dec. 4, 1866 |
| 941,330 | Mittinger | Nov. 23, 1909 |
| 1,036,767 | Wojidkow | Aug. 27, 1912 |
| 1,108,712 | Curtiss | Aug. 25, 1914 |
| 1,130,131 | Anderson | Mar. 2, 1915 |
| 1,309,414 | Huning | July 8, 1919 |
| 2,109,363 | Williams | Feb. 22, 1938 |
| 2,557,317 | Serio | June 19, 1951 |
| 2,560,214 | Cameron | July 10, 1951 |
| 2,562,433 | Moore | July 31, 1951 |
| 2,628,553 | Titus | Feb. 17, 1953 |
| 2,809,578 | Campbell | Oct. 14, 1957 |
| 2,866,401 | Sidell | Dec. 30, 1958 |